United States Patent [19]
Gillbe

[11] Patent Number: 5,873,726
[45] Date of Patent: Feb. 23, 1999

[54] SIMULATOR INCLUDING IMAGE GENERATOR AND METHOD OF PRODUCING A SIMULATOR

[76] Inventor: Ivor Gillbe, "Greensleeves", Bridge Road, Leigh Woods, Bristol BS8 3PE, United Kingdom

[21] Appl. No.: 737,673

[22] PCT Filed: May 19, 1995

[86] PCT No.: PCT/GB95/01137
§ 371 Date: Feb. 13, 1997
§ 102(e) Date: Feb. 13, 1997

[87] PCT Pub. No.: WO95/32489
PCT Pub. Date: Nov. 30, 1995

[30] Foreign Application Priority Data

May 23, 1994 [GB] United Kingdom .................... 9410254

[51] Int. Cl.⁶ ........................................................ G09B 9/02
[52] U.S. Cl. ................................................. 434/29; 434/38
[58] Field of Search ................................. 434/43, 44, 69, 434/38, 29

[56] References Cited

U.S. PATENT DOCUMENTS

| | | |
|---|---|---|
| 2,579,177 | 12/1951 | Miles ........................................ 434/38 |
| 3,205,303 | 9/1965 | Bradley ................................. 434/43 X |
| 4,129,365 | 12/1978 | Aversano et al. . |
| 4,234,891 | 11/1980 | Beck et al. . |

FOREIGN PATENT DOCUMENTS

| | | |
|---|---|---|
| 340097 | 11/1989 | European Pat. Off. . |
| 2561475 | 9/1985 | France . |

OTHER PUBLICATIONS

Patent Abstracts of Japan, vol. 018 No. 241 (P–1733), May 1994.

Patent Abstracts of Japan, vol. 014 No. 452 (P–1112), Sep. 1990.

*Primary Examiner*—Jeffrey A. Smith
*Attorney, Agent, or Firm*—Larson & Taylor

[57] ABSTRACT

A simulator, example, a flight simulator, includng an image-generating display (20) and first and second mirrors (30, 40). The mirrors (30, 40) are singly curved and have substantially perpendicular axes, so that light from the display passes to the the concave surface of the first mirror (30), and from that mirror (30) to the concave surface of the second mirror (40), and from the second mirror (40) to a user of the simulator.

7 Claims, 1 Drawing Sheet

SIMULATOR INCLUDING IMAGE GENERATOR AND METHOD OF PRODUCING A SIMULATOR

The present invention relates to the generation of an image, for example in a flight simulator or other arrangement in which an artificial panorama is to be viewed.

When the eye receives light from an object, the angle of divergence of the light from the object to the eye depends on the distance therebetween. Distant objects will have parallel, or virtually parallel light rays therefrom, whilst light from near objects will diverge significantly at the eye. Therefore, if an image of a panorama is generated on a display such as a monitor or a projection onto a screen for use in a flight simulator, the person using that simulator will be able to judge the distance to the monitor on the basis of the light divergence and thus will not be presented with a realistic panorama.

Therefore, simulators have been produced in which light from a display is incident on the concave surface of a spherical mirror, since that mirror then collimates the light into parallel rays, thereby giving the impression that the light from the spherical mirror has its origin at infinity. The person using the simulator thereby is given the impression of a realistic panorama of distant objects, rather than perceiving the image generated by the display as being close.

However, spherical mirrors are difficult and expensive to produce, due to the high levels of optical accuracy needed, and therefore the present invention seeks an alternative.

At its most general, the present invention proposes that two mirrors are used, each of which is singly curved. This means that the surface of each mirror is curved but any point on the surface has a tangent plane which meets the surface at a line. This is to be contrasted with spherical or other compound curved surfaces in which tangent planes always meet the surface at a point. The two mirrors are positioned so that light from a display passes from one mirror to the other, and thence to the eye of an observer.

Such singly curved mirrors may be formed by bending a plane flexible sheet using bending moments and forces applied to or adjacent two opposite edges only. The sheet can thus be bent by mounting it in a frame that exerts bending moments and forces close to its edges, to give it its singly curved shape. The sheet may be provided with a reflective layer either before or after bending.

The optical effect thus achieved will permit collimation of a light beam which has been reflected from the concave surfaces of the mirrors.

Therefore, the present invention may provide a simulator having an image-generating display from which light passes to the first singly curved mirror, from that mirror to the second singly curved mirror, and from that mirror to the eye of the person using the simulator. Additional optical components (such as plane mirrors) may be provided in the optical path between the display and the eye, but this is undesirable as each reflection is not perfect and therefore reduces the amount of light being received. Therefore, the simplest arrangement is for two cylindrical mirrors to be immediately adjacent, and the cylindrical mirror which is closest along the optical path to the display be semi-reflective only, so that the second mirror is viewed through the first mirror.

Preferably the mirror system is symmetric about the plane containing the viewing point of the user and the normal to the centre of the display.

In such an arrangement, there is preferably a plane in which the mirror is curved and perpendicular to which the mirror is straight; i.e. the mirror has a direction of translational symmetry. The directions of translational symmetry of the two mirrors are then preferably mutually perpendicular.

It should be noted that, since the aim of the present invention is to present the image from the display as if it originates at a remote distance, the term "collimated" should be interpreted as including the case where the light diverges by only a small amount, or is collimated less in one axis than another, such as when the image is to be effectively at the horizon, rather than necessarily at infinity. The term "cylindrical" should be interpreted in a similar way.

Preferably, the axis through the centre of the display, perpendicular to the plane in which the image is generated, will be incident on the first mirror at an angle of 45° to the tangent to the mirror surface at that point. The effect of this is to reflect light passing along that axis through 90° and thus the relative position of the first and second mirrors can be chosen easily. Other geometries are possible, but in general are more complex and are therefore less desirable.

It can be noted that cylindrical mirrors may be formed by shaping a plane mirror of flexible material, and thus such mirrors are easier to produce than spherical mirrors. However, the present invention is not limited to the use of cylindrical mirrors, and other singly curved mirrors e.g. parabolic mirrors may be used.

In the specification we used the terms 'singly curved', perpendicular, and other similar geometric terms. It should be noted that practical embodiments may not achieve strict, mathematically perfect, configurations. Deviations from absolute perpendicularity, straightness, etc are possible which do not substantially affect the behaviour of the light passing from the display via the two mirrors to the observer. Moreover, the present invention is concerned with the shape of the mirrors over a substantial part of their area, but deviations from the singly curved configuration are possible at the peripheries of the mirrors.

Embodiments of the present invention will now be described in detail, by way of example, with reference to the accompanying drawing, in which.

Figure 1:
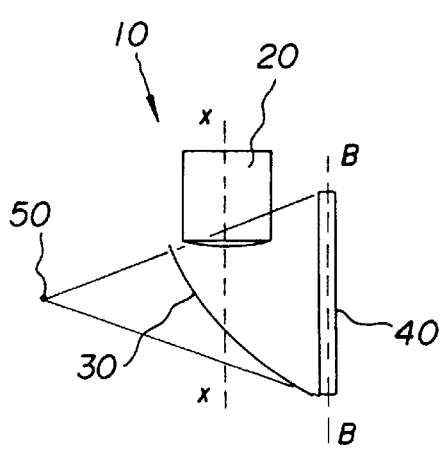
FIG. 1 is a side view of a simulator being a first embodiment of the present invention.

In the first embodiment of FIGS. 1, 2 and 3, the simulator 10 comprises a display in the form of a monitor 20, a first cylindrical mirror 30 mounted below the monitor 20 and a second cylindrical mirror 40 mounted adjacent the first cylindrical mirror. The monitor 20 generates an image to be viewed, such as a panorama, and light from the monitor 20 passes to the first cylindrical mirror 30. That light will diverge relative to the vertical axis X-X, and if viewed directly would be seen by the viewer as originating at a relatively close location (i.e. the location of the monitor 20). Therefore, if the image generated by the monitor 20 is to be perceived as originating at a remote distance, e.g. the horizon or infinity, the light must be collimated, i.e. turned into a parallel beam with substantially no divergence.

As can be seen from FIG. 1, the cylindrical mirror 30 is curved about a horizontal axis, corresponding to the longitudinal axis of the cylinder. The light diverging from the monitor 20 can be considered as diverging about two horizontal axes relative to the vertical axis X-X, one of those axis being in the plane of the paper in FIG. 1 and the other being perpendicular to the plane of the paper. Because the mirror is cylindrical, the mirror 30 will have the effect of converging the light in a vertical plane, and if the monitor 20 is positioned appropriately, that convergence will be sufficient to collimate the light in the vertical plane. The light will continue to diverge in the horizontal plane, because the component of the light which is perpendicular to the plane of the paper in FIG. 1 will encounter a plane surface at the mirror and therefore its divergence will continue.

The light reflected by the mirror 30 will then pass to the second mirror 40. As can be seen from FIG. 2, that second mirror 40 is also a cylindrical mirror, curved about a vertical axis. Hence, it will tend to converge light incident thereon in a horizontal plane. It will not affect the convergence or divergence of light in a vertical plane.

Since the axis of curvature of first and second mirrors 30,40 are perpendicular, one will converge the beam in a vertical plane and the other in a horizontal plane. The net effect of these two actions is to generate a collimated beam from the second mirror 40. Again, this depends on suitable positioning of the second mirror 40 relative to the first mirror 30. Having generated a collimated beam by reflection at the second mirror 40, that beam then passes towards the first mirror 30. If the image thus generated is to be viewed, the first mirror 30 must therefore permit that beam to pass through it, and for this reason the first mirror 30 is only semi-reflective. If the second mirror 40 is viewed from a viewing point 50, the light from the monitor 20 reaching that viewing point 50 will be collimated, and therefore a person at that viewing point will see the monitor 20 as being located at infinity or the horizon, thereby giving the impression that the image in the monitor 20 is at a remote site, rather than being close to the point 50. The viewer therefore sees the image as a simulation of the view that would be received when e.g. looking out of a window.

Figure 2:
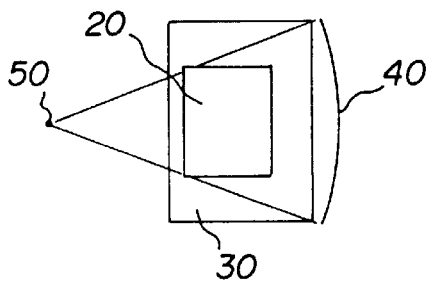
FIG. 2 is a plan view of the simulator of FIG. 1.
Figure 3:
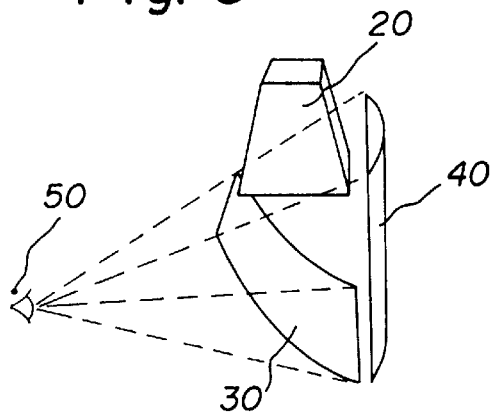
FIG. 3 is a perspective view of the simulator of FIG. 1.

FIG. 3 is a perspective view of the embodiment of FIGS. 1 and 2 in which the curvature of the mirrors is indicated by shading.

With this embodiment, the two cylindrical mirrors 30,40 replace the use of a spherical mirror. It is relatively straightforward to form cylindrical mirrors by shaping them around a cylindrical former or bending a plane mirror in situ to the required shape. A plane mirror of e.g. plastics material may be formed, then shaped using the former. Thus, the simulator of FIGS. 1, 2 and 3 is easy to manufacture. This makes the simulator less expensive than known simulators.

The present invention is not limited to these cylindrical mirrors, and other curved shapes are possible e.g. parabolical mirrors. In fact, the present inventor has discovered that it is beneficial to use a first mirror 30 in which the curvature is relatively shallow distant from the monitor but more pronounced proximate thereto. The curvature at each point may be adjusted so that the apparent magnification of the image perceived by the user is uniform across the image.

The present inventor has given particular attention to overcoming problems of image distortion which may arise in embodiments of the present invention, just as it may in conventional simulators.

One method of reducing distortion of the image is to select the radius of curvature of the second mirror 40, and the average radius of curvature of the first mirror 30, to be approximately 10% greater than the distance from the viewing point to the rear mirror. While this means that the image is not viewed as being exactly at infinity, since the light rays reaching the eye are not exactly parallel, the effect of great distance remains convincing.

Some embodiments of the simulator are subject to "horizontal barrelling" of the image, i.e. the image appears wider in the middle than at the top and bottom. This distortion can be reduced in any of a number of ways.

Firstly, the curvature of the second mirror 40 can be varied slightly along its axis, for example to have slightly tighter curvature at its top and bottom.

Secondly, and more preferably, horizontal barrelling may be reduced simply by use of the pincushion distortion control available on many monitors. In this method of reducing distortion, the pin-cushion control is set so that the image produced by the monitor has concave edges, and is thus pre-distorted in a way which compensates for the barrelling produced by the mirror assembly. Such a method of image distortion is particularly appropriate when the barrelling is virtually symmetrical about the horizontal line through the centre of the image.

A third method of overcoming both horizontal and vertical distortion is to adapt the image generator so as to produce electronically an image on the monitor which is distorted in a way which compensates for the distortion produced by the mirror assembly.

Although, as mentioned above, a mirror for use in the invention may be formed from a plastics material, for example acrylic, the present inventor has discovered that even if a plastic mirror is provided with carefully designed side guides, it may still be subject over time to creepage under stress, resulting in distortion of the image. One way of reducing this problem is to stress relieve the acrylic material. Alternatively, hardier materials, such as sheet APS or glass may be employed. It is relatively easy to bend sheet glass by heating it over a singly curved metal former, and the tooling for this process is relatively cheap. A mirror or beam splitter finish can then be applied to the shaped glass by vacuum deposition.

A simulator according to the invention will be sensitive to vibration in cases when this vibration affects the curvature of the mirrors. This is particularly important in those applications in which the simulator is mounted on a motion platform, since on such a platform the acceleration forces and vibration levels are often high. Therefore, the simulator assembly may be provided as a sturdy self-contained module, in which the monitor and mirrors are mounted securely relative to each other, for example by means of triangular side plates and by cross-bracing behind the second mirror 40. The simulator assembly module may then be shock mounted on the motion platform, for example by means of mounting holes provided in the simulator module close to the monitor. Thus, the weight of the monitor is supported directly, with the relatively light mirror cross-brace and side plate assembly hanging below.

The geometry of FIGS. 1 2 and 3 is the preferred one, since it lends itself to multiple modules mounted radially about the viewing point to increase the horizontal field of view. However, other geometries of the first and second mirrors 30,40 are possible, provided that their axes of curvature (i.e. the longitudinal axis of the cylinders) are substantially perpendicular. Of course, while it is necessary for the mirrors 30,40 to be arranged so that light reflected by the first mirror 30 passes to the second mirror 40, it is possible to add additional optical components into the arrangement of FIGS. 1, 2 and 3. However, since each optical component will reduce the amount of light, the arrangement in FIGS. 1, 2 and 3 is thus preferred.

In that arrangement, the tangent to the curve of the first mirror 30 at the intersection of the vertical axis X-X through the monitor 20 is at 45° to the vertical axis, which is parallel to the axis B-B through the second mirror 40. In some arrangements, however, it may be preferable to select the angle between the first mirror and vertical axis X-X to be slightly smaller (i.e. the first mirror 30 is closer to the vertical than is shown in FIG. 1), to increase the vertical magnification of the image.

It is beneficial in some embodiments to tilt the monitor so that its axis X-X is directed slightly away from the user. This reduces the risk of a secondary reflection from the monitor being visible.

Figure 4:
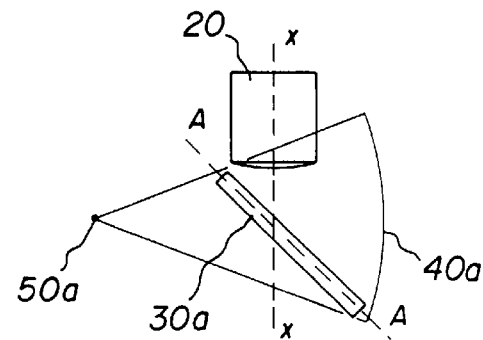
FIG. 4 is a side view of a simulator being a second embodiment of the present invention.
Figure 5:
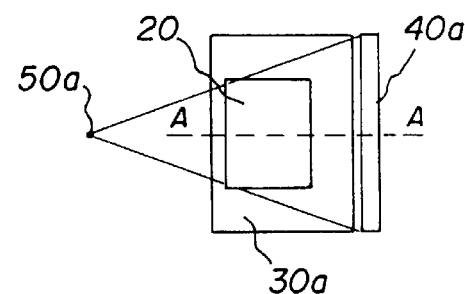
FIG. 5 is a plan view of the simulator of FIG. 4.
Figure 6:
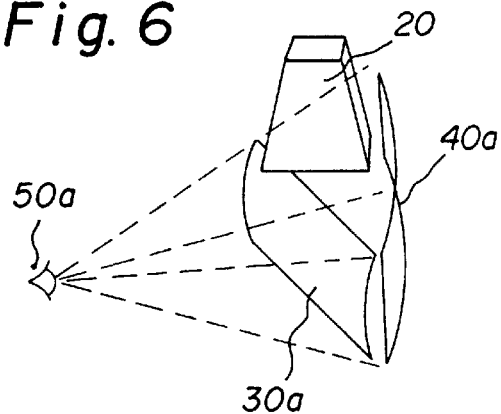
FIG. 6 is a perspective view of the simulator of FIG. 4.

FIGS. 4, 5 and 6 show a second embodiment of the invention, in which the axes of the first and second mirrors have a different orientation from the first embodiment. The other components of the second embodiment correspond to the components of the first embodiment, and the same reference numerals are therefore used.

In the second embodiment, the first mirror 30a is curved about an axis which is parallel to the line A-A in FIG. 4 which is at 45° to the vertical axis X-X through the monitor 20. The second mirror 40a is then curved about a horizontal axis. Since the axis of curvature of the first mirror 30a is parallel to the plane of the paper in FIG. 4, it is again perpendicular to the axis of curvature of the second mirror 40a. Hence, the net effect of the first and second mirrors 30a and 40a on light diverging from the monitor 20 is the same as in the first embodiment, namely to converge the light in two mutually perpendicular directions to generate a collimated beam from the second mirror 40a. The first mirror 30a converges the light to collimate it in a horizontal plane, whilst the second mirror 40a converges the light to collimate it in a vertical plane. Since the light can again be considered to be diverging about horizontal and vertical axis, the net effect is again similar to a spherical mirror. Again, as in the first embodiment, the first mirror 30a is only semi-reflective Although the invention has been described above with reference to two embodiments, many variations are possible within the scope of the invention, as will be clear to one skilled in the art. For example, it is not necessary for the display of the present invention to be a monitor. The display could be formed by back projection onto a translucent screen.

I claim:

1. A method of producing a simulator comprising the steps of:

providing an image generating display;

bending first and second flexible planar sheets;

forming a reflective layer on said sheets to form respective first and second mirrors the reflective layer on the first mirror being semi-reflective; and arranging said display and said first and second mirrors such that light from said display passes to said first mirror, from said first mirror to said second mirror and from said second mirror back towards and through said first mirror to a user of the simulator.

2. A simulator comprising:

an image-generating display;

a first singly curved mirror having an axis and being semi-reflective, said display passing light to said first mirror; and a second singly curved mirror having an axis which is perpendicular to the axis of said first mirror, said second mirror being arranged to direct light received from said first mirror back towards and through said first semi-reflective mirror to a user of the simulator.

3. A simulator according to claim 2 in which said first and second mirrors are symmetric about the plane containing the viewing point of the user and the normal to the centre of the display.

4. A simulator according to claim 2 in which said first and second mirrors have a direction of translational symmetry.

5. A simulator according to claim 4 in which the shape of each said mirror is selected to eliminate divergence of the light in a direction perpendicular to the direction of translational symmetry of the mirror, whereby said two mirrors collimate said light.

6. A simulator according to claim 2 in which the axis through the centre of the display perpendicular to the plane in which the image is generated intersects said first mirror at an angle of about 45° to the mirror surface.

7. A simulator according to claim 2 in which a portion of the first mirror proximate said display is of greater curvature than a distal portion of the first mirror.

* * * * *